Aug. 31, 1965  G. JANSEN  3,203,448
VALVE
Filed Dec. 3, 1962
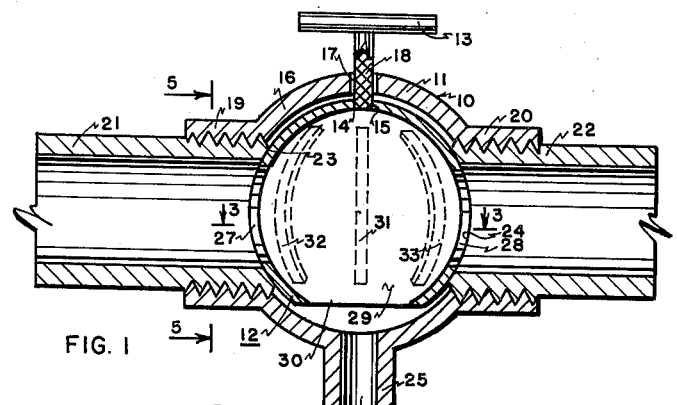
FIG. 1
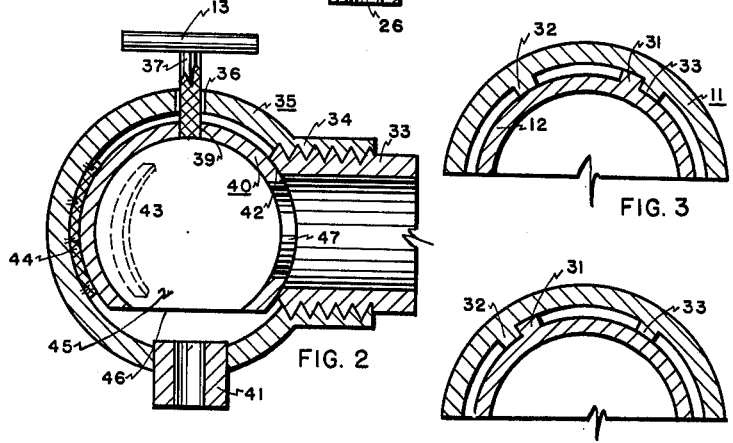
FIG. 2
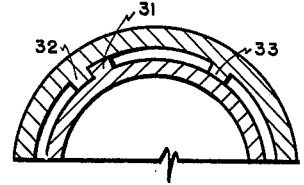
FIG. 3
FIG. 4
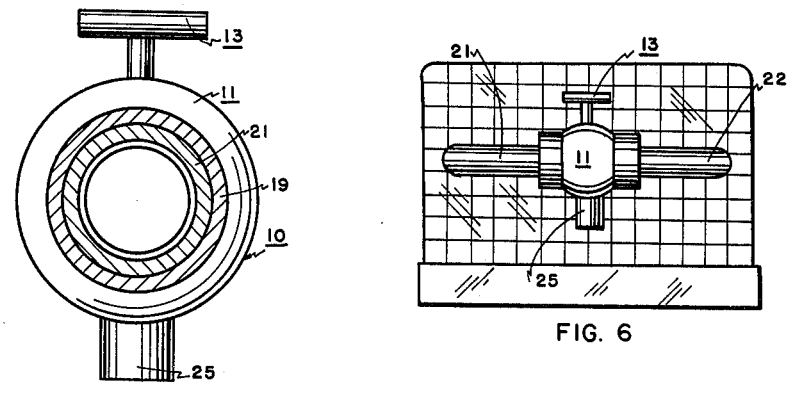
FIG. 5
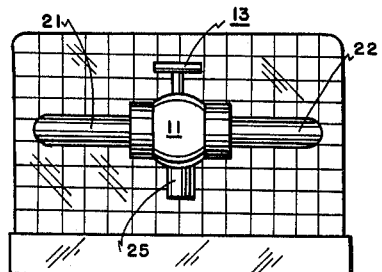
FIG. 6
INVENTOR.
GERHART JANSEN
BY *M. Ralph Shaffer*
HIS ATTORNEY

United States Patent Office 3,203,448
Patented Aug. 31, 1965

3,203,448
VALVE
Gerhart Jansen, 918 East East So. Temple,
Salt Lake City, Utah
Filed Dec. 3, 1962, Ser. No. 241,623
3 Claims. (Cl. 137—625.41)

The present invention relates to liquid valves and, more particularly, to a new and improved valve of simplified and yet highly reliable construction, insuring optimum operation with a minimum number of components.

Accordingly, the principal object of the present invention is to provide a new and improved spherical valve which, if desired, may be designed for mixing two or more liquids which may vary either in temperature, color, or other characteristics so that a desired output mixture may be obtained by use of the valve.

A further object of the invention is to provide a new and improved valve wherein automatic stop means are provided in the valve, and this in a position interior of the valve casing.

A further object of the invention is to provide a new and improved valve wherein limit stop means, disposed between the spherical valve body and casing of the valve, automatically serve additionally as bearing supports to accommodate the rotation of the spherical valve body of the valve.

A further object of the invention is to reduce friction between the spherical valve body and the valve casing of the valve component.

A further object of the invention is to provide in a valve a spherical valve body journal or mount which holds the spherical valve body of the valve in fixed alignment for all rotations thereof, and this in a manner as to prevent leakage between the valve body and valve casing.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which;

FIGURE 1 is a longitudinal vertical section, shown in fragmentary view, of a valve incorporating the features of the present invention in one embodiment thereof.

FIGURE 2 is an illustration similar in form to FIGURE 1, but illustrates a second embodiment of the invention in a valve of the single inlet type.

FIGURE 3 is a fragmentary, sectional view taken along the line 3—3 in FIGURE 1.

FIGURE 4 is a view similar to FIGURE 3, but illustrates the opposite limit stop relative to that shown in FIGURE 3.

FIGURE 5 is a section taken along the line 5—5 in FIGURE 1.

FIGURE 6 is a front elevation of the valve when installed over a sink area, for example.

In FIGURE 1 the valve 10 is shown to include valve casing 11, a spherical valve body 12, and a handle 13 which is threaded at 14 into threaded aperture 15 of the spherical valve body 12. More particularly, the valve casing includes a central spherical portion 16 which is provided with an aperture 17 for admitting the shaft 18 of handle 13. Suitable packing for the shaft 18 may be utilized between the same and central portion 16 as desired. The valve casing 11 is provided with a pair of internally threaded ports 19 and 20 which threadedly receive first and second conduits 21 and 22, respectively. Each of the first and second conduits 21 and 22 is provided with a concave, spherically ground extremity 23 and 24 which are respectively in a bearing and sealing engagement with the spherical valve body 12. Spout 25 is provided with outlet orifice 26. The spherical valve body 12 is provided with inlet orifices 27 and 28 which communicate with the hollow interior 29 of the spherical valve body 12. The outlet orifice 30 of spherical valve body 12 affords communication between the latter and the outlet orifice 26 of spout 25.

Of special importance is the fact that the spherical valve body 12 includes a protuberance or rib 31 disposed on its outer periphery. Correspondingly, the valve casing 11 includes rib stops 32 and 33. Thus, when handle 13 is rotated in a clockwise direction, looking down, rib 31 of the spherical valve body 12 will come into engagement with rib stop 33 of valve casing 11. See FIGURE 3. Correspondingly, the counter-clockwise rotation, looking down, of handle 13, will produce a stop engagement between rib 31 and rib stop 32. The rib and rib stops 31, 32 and 33 will be so constructed and arranged with respect to their respective parts and the inlet orifices 27 and 28 such that a desired condition will be achieved, as for example, that one will be precluded from turning handle 13 beyond full flow condition relative to the liquid passing through first and second conduits 21 and 22, or, as shown, the limit stop action of rib and rib stops 31, 32 and 33 will come into play when the spherical valve body 12 is turned so that inlet orifices 27 and 28 are disposed beyond their registry (shown in FIGURE 1) with the conduits 21, 22.

When the rib 31 and/or rib stops 32 and 33 completely span the spacing between valve casing 11 and spherical valve body 12, so as to engage in a sliding bearing engagement the corresponding part (11 or 12), then not only is a limit stop function served by the rib 31 and rib stops 32 and 33, but also the same serve as a spherical bearing type supports for spherical valve body 12 so that the latter may be held in satisfactory alignment throughout all turning motions accomplished by the rotation of handle 13 about its shaft 18. Thus, in the embodiment shown in FIGURES 1 and 3–6, it will be noted that an effective limit stop means is provided, by virtue of the inclusion of rib 31 and rib stops 32 and 33, which rib 31 and rib stops 32 and 33 may be positioned either as shown in FIGURE 1 for the purpose of providing an automatic stop for handle 13 during no-flow condition or, in the alternative, to provide a limit stop action so that turning of handle 13 beyond the full force of the water an open-aperture condition is rendered impossible.

In FIGURE 2 is illustrated a second embodiment of the invention wherein conduit 33 is threaded into boss or port 34, the latter forming an integral part of valve casing 35. The valve casing 35 includes an aperture 36 for receiving shaft 37 of handle 38 in a manner similar to FIGURE 1. Shaft 37 is threaded into aperture 39 of spherical valve body 40, and the latter is provided with hollow interior 45, outlet opening or aperture 46, and inlet orifice 47 in communication with the former. Valve casing 35 includes spout 41. Again as in FIGURE 1, the conduit 35 has a concave, spherically ground extremity 42 which is disposed in a bearing engagement with the spherical valve body 40. Rib 43 is disposed on the outer side of spherical valve body 40. A rib stop or liner 44 is disposed on the inner surface of valve casing 35 and preferably is disposed diametrically opposite to conduit 33. Thus, this liner or rib stop 44 serves not only as a stop abutment for rib 43 on spherical valve body 40, but also serves as a liner for holding the spherical valve body firmly in position against its bearing engagement with conduit 33.

Obviously the ribs and rib stops shown in the drawings may be directly affixed to the opposite associated part (either 11 or 12 in FIGURE 1 or 35 or 40 in FIGURE 2).

Preferably, either the rib stops (32, 33 in FIGURE 1, or 44 in FIGURE 2), or ribs 31 (FIGURE 1) and 43 (FIGURE 2), or both, may be composed of Babbit metal or other suitable metal with a low coefficient of friction characteristic.

In the case of FIGURE 2, the operation is as follows. Then the handle 38 is turned so that rib 43 engages rib stop 44, there will be a limit-stop type interuption in the rotation of spherical valve body 40 at a time when inlet orifice 47 is disposed out of registry with conduit 33. The rib stop or liner 44, in addition to serving as a limit stop, also provides a direct bearing support for the spherical valve body 40 within valve casing 35.

In addition to adaptation for the spherical valve specifically illustrated in the drawings, the present invention is also suitable for incorporation in other types of spherical valves, for example, that shown in the inventor's United States Patent 3,043,337.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:
1. A valve including, in combination, a hollow, spherical valve body having a control aperture, at least one inlet orifice, and an outlet orifice; a hollow, valve casing operatively containing said spherical valve body and having an outlet spout and inlet port means; control means passing through said control aperture and affixed to said spherical valve body for moving the latter within said hollow valve casing; and conduit means operatively connected to said inlet port means for communication therewith, said conduit means having extremity means of spherically concave character, said extremity means being in spherical bearing engagement with said spherical valve body; and wherein said spherical valve body and valve casing are provided with intercooperating stop means for determining progressive movement of said spherical valve body within said valve casing at a desired valve condition; and wherein said stop means of said valve casing is concave-configured and disposed diametrically opposite with respect to said extremity means of said conduit means, cooperating therewith in supporting said spherical valve body in a manner as a spherical bearing.

2. A valve including, in combination, a hollow, spherical valve body having a control aperture, a pair of diametrically opposite inlet orifices, and an outlet orifice; a hollow, valve casing peripherally spaced from and operatively containing said spherical valve body and having an outlet spout and a pair of diametrically opposite, internally threaded, inlet port means; control means passing through said control aperture and affixed to said spherical valve body for moving the latter within said hollow valve casing; a pair of externally threaded conduits threaded into and past respective ones of said inlet port means for communication therewith, each of said conduits having an extremity of spherically concave character, and each of said extremities being in spherical bearing engagement with said spherical valve body, and wherein said spherical valve body and valve casing are provided with intercooperating concave-configured stop means for determining progressive movement of said spherical valve body within said valve casing at a desired valve condition and for spherically journaling said valve body within said valve casing.

3. A valve including, in combination, a hollow, spherical valve body having a control aperture, a pair of diametrically opposite inlet orifices, and an outlet orifice; a hollow, valve casing peripherally spaced from and operatively containing said spherical valve body and having an outlet spout and a pair of diametrically opposite, internally threaded, inlet port means; control means passing through said control aperture and affixed to said spherical valve body for moving the latter within said hollow valve casing; a pair of externally threaded conduits threaded into and past respective ones of said inlet port means for communication therewith, each of said conduits having an extremity of spherically concave character, and each of said extremities being in spherical bearing engagement with said spherical valve body, and wherein said spherical valve body and valve casing are provided with intercooperating concave-configured stop means for determining progressive movements, of whatever direction, of said spherical valve body within said valve casing at desired valve condition and for spherically journaling said valve body within said valve casing.

References Cited by the Examiner

UNITED STATES PATENTS

| 117,704 | 8/71 | Warren | 251—316 |
| 982,815 | 1/11 | Hobbs | 251—315 |
| 1,299,586 | 4/19 | Leibing | 137—625.41 X |
| 1,478,688 | 12/23 | Whidden | 251—315 X |
| 1,614,437 | 1/27 | Cochran | 137—625.41 |
| 2,905,196 | 9/59 | Van Wagenen | 137—625.47 X |
| 3,043,337 | 7/62 | Jansen | 137—625.41 |

FOREIGN PATENTS

| 273,187 | 1/51 | Switzerland. |

M. CARY NELSON, *Primary Examiner.*